United States Patent Office 2,832,561
Patented Apr. 29, 1958

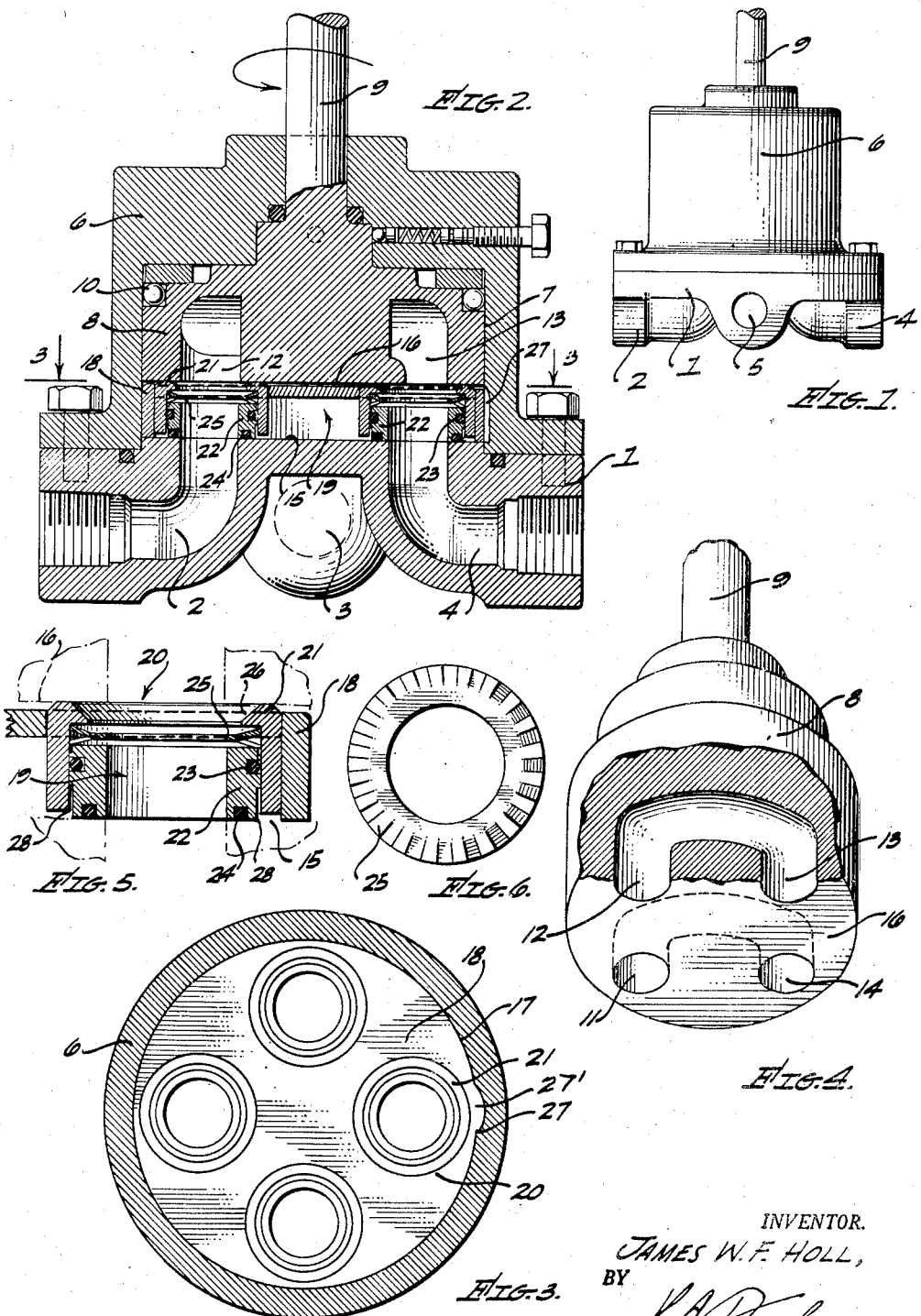

2,832,561

ROTARY VALVE WITH SEAL SEAT

James W. F. Holl, Temple City, Calif.

Application May 4, 1953, Serial No. 352,675

2 Claims. (Cl. 251—174)

This invention relates to a novel rotary valve having a seal seat between the rotary disc and the valve body, the seal seat being so constructed and arranged that it will effectively engage and seal off against two substantially parallel faces, one face being on the valve body and the other face being on the rotary disc.

An object of my invention is to provide a novel seal seat which will effectively align itself with the flat surfaces of the disc and the body, particularly when these faces (due to manufacturing difficulties) may not be absolutely parallel to each other. This construction eliminates costly close tolerances in the manufacture of the parts, and also permits of easy inter-changeability when replacing the parts.

A feature of my invention is to provide an off-set face on the outside diameter of the floating seal seat which permits the seat to oscillate in the bore of the seat and to tilt sufficently so that the seat and the seal will accurately fit, and at the same time will prevent the O-ring construction from blowing by under the fluid pressures in the valve.

Another feature of my valve, therefore, is to prevent leakage under high pressure, even with a moderate degree of misalignment of the seating surfaces.

Another object of my invention is to provide a metal to metal seat which will tend to wear in and, therefore, to seat more tightly, rather than to wear out and leak. This is accomplished by the metal to metal seat which will scrape away any foreign matter, such as abrasive material, and will, therefore, tend to seat itself.

Another object of my invention is to provide a novel seal and seat in a rotary valve in which the seal and seat are completely assembled prior to installation in the valve, and thus are more easily inspected and kept to close tolerances in production. This will permit the valve to operate under higher hydraulic pressures than other types of disc valves.

Another feature of my invention is to permit a variation in the hydraulic balance of the valve by varying the degree of undercut on the top face of the valve seat, thus permitting the hydraulic pressure within the valve to be used to assist a spring, forcing the face of the seal and seat into their contacting position.

Another feature of my invention resides in the interior construction of the valve wherein the bores can be of the same size as the exterior hydraulic lines, therefore, the pressure drop through the valve will be reduced to a minimum.

Other objects, advantages and features of invention may appear from the accompanying drawing, the subjoined detailed description and the appended claims.

In the drawing:

Figure 1 is a side elevation of my rotary valve.

Figure 2 is a transverse sectional view of the same.

Figure 3 is a sectional view taken on line 3—3 of Figure 2.

Figure 4 is a perspective view of the rotary disc with parts broken away to show interior construction.

Figure 5 is a transverse sectional view of one of the seal seats.

Figure 6 is a plan view of one of the spring rings.

Referring more particularly to the drawing, the numeral 1 indicates the valve body in which four (or more) ports 2—3—4 and 5 are provided. These ports are variously connected to exterior hydraulic lines (not shown) and fluid is conducted from one port to another as desired by rotation of the rotary disc, which will be subsequently described. A cap 6 is mounted on the body 1 and is preferably bolted in this position to complete the housing assembly of the valve. The cap 6 defines a chamber 7 in which the rotary disc 8 is accurately fitted. The disc 8 includes a shaft 9 which extends out of the cap 6, and a wheel or lever is attached to this shaft for the purpose of rotating the disc, all of which is usual and well known. An annular bearing 10 is provided between upper surfaces of the cap 6 and the bottom surface of the recess 7, thus providing a thrust bearing for the cap 6 and enabling this cap to be rotated more easily. The disc 8 is provided with four ports 11—12—13 and 14 which are connected in pairs, as shown in Figure 4. It will thus be evident that by rotating the disc 8 the ports 11—12—13 and 14 therein can be variously aligned with the ports 2—3—4 and 5 in the body 1, and thus variously conducting the fluid to different hydraulic lines.

The body 1 is formed with a flat upper surface 15 and the disc 8 is provided with a flat bottom surface 16. It is desirable that the surfaces 15 and 16 be as nearly parallel as possible. However, in manufacturing it is difficult to hold these surfaces to close tolerances. To accomplish an effective seal between the surfaces 15 and 16, especially when the disc 8 is rotated from one position to another, I provide a seat seal 17 which comprises the following construction: A cup 18, formed of an appropriate metal, is positioned in the space 19 between the surfaces 15 and 16. Mounted in the cup 18 are a plurality (four in number) of seat seal assemblies 20. These seat seal assemblies are mounted with a press fit in the cup 18 and each of them consist of an outer sleeve 21 which bears against the surface 16 of the disc 8. An inner sleeve 22 fits within the sleeve 21 and is provided with an O-ring 23 which bears against the inner surface of the sleeve 21. A bottom O-ring 24 bears against the flat surface 15 and thus seals against this surface and prevents leakage around the bottom of the sleeve 22. A spring 25 is annular in form and is positioned between the sleeve 21 and the top of the sleeve 22, thus pressing these two sleeves apart and urging them into their respective contacts with ths surfaces 16 and 15.

Hydraulic balance can be changed by varying the taper 26 on the upper surface of the sleeve 21, this hydraulic balance tending to press the sleeves 21 and 22 downwardly and assisting in sealing against the flat surface 15. The seal assemblies 20 are non-rotatably held within the cup 18 and the cup itself is held against rotation in the cap 6 by an indentation 27 which receives a projection 27 on the cup, which acts as a key to prevent misalignment of the various assemblies 20 with relation to the various ports 2—3—4 and 5 in the body 1 of the valve.

It will be evident that my seal seat construction enables me to assemble the seal seat as a unit, and also these assemblies do not have to be fit within a bore in a valve. Furthermore, they are so constructed that extremely accurate tolerances are not required, and some misalignment of the surfaces 15 and 16 can be permitted and the valve will still operate effectively under high pressures. Further, to permit the seal seats to effectively engage the surfaces 15 and 16, I undercut or recess the sleeve 22 on its outer surface, as shown at 28. This permits the sleeve 22 to tilt slightly within the sleeve 21 and, therefore, enables the bottom of the sleeve 22 and the top of the sleeve 21 to more easily find and engage the respective flat surfaces 15 and 16, and thus provide an effective and complete seal.

Having described my invention, I claim:

1. A seal seat for a valve having a valve body, said valve body having flat spaced-apart surfaces therein with ports extending through said surfaces, said seal seat being positioned between the spaced-apart surfaces, said seal seat being aligned with a port in the valve body, said seal seat including an outer sleeve bearing against one of said flat spaced-apart surfaces, an inner sleeve positioned within the first named sleeve, the inner sleeve bearing against the other flat spaced-apart surface means engaging both of the inner and outer sleeves and urging said sleeves against said spaced-apart surfaces, an O-ring on one of said sleeves bearing against the other sleeve, and an O-ring on one of said sleeves bearing against one of the flat spaced-apart surfaces of the body, and a cup mounted within the body between said flat spaced-apart surfaces, and means mounting said seal seat in the cup.

2. A seal seat for a valve having a valve body, said valve body having flat spaced-apart surfaces therein with ports extending through said surfaces, said seal seat being positioned between the spaced-apart surfaces, said seal seat being aligned with a port in the valve body, said seal seat including an outer sleeve bearing against one of said flat spaced-apart surfaces, an inner sleeve positioned within the first named sleeve, the inner sleeve bearing against the other flat spaced-apart surface, an O-ring on one of said sleeves bearing against the other sleeve, and an O-ring on one of said sleeves bearing against one of the flat spaced-apart surfaces of the body, and a cup mounted within the body between said flat spaced-apart surfaces, and means mounting said seal seat in the cup, and an annular spring arranged between the inner and outer sleeves and urging said sleeves apart in an axial direction.

References Cited in the file of this patent

UNITED STATES PATENTS

| | | |
|---|---|---|
| 1,632,220 | Demarest | June 14, 1927 |
| 2,209,991 | McGill | Aug. 6, 1940 |
| 2,377,473 | Wolcott | June 5, 1945 |
| 2,519,574 | Holl | Aug. 22, 1950 |
| 2,529,412 | Parker | Nov. 7, 1950 |
| 2,601,967 | Larsen | July 1, 1952 |
| 2,628,060 | Parker | Feb. 10, 1953 |
| 2,653,003 | Overbeke | Sept. 22, 1953 |
| 2,669,417 | Ray | Feb. 16, 1954 |
| 2,696,219 | Barksdale | Dec. 7, 1954 |

FOREIGN PATENTS

| | | |
|---|---|---|
| 829,905 | France | 1938 |